United States Patent [19]

Omika et al.

[11] 4,283,313
[45] Aug. 11, 1981

[54] CATHODE-PRECIPITATING ELECTRODEPOSITION COATING COMPOSITION

[75] Inventors: Hiroyoshi Omika, Yokohama; Hajime Hara, Fujisawa; Yutaka Otsuki, Yokohama; Yoshihiko Araki, Kawasaki; Kazuho Aoyama, Tokyo, all of Japan

[73] Assignee: Nippon Oil Company, Ltd., Tokyo, Japan

[21] Appl. No.: 89,748

[22] Filed: Oct. 30, 1979

[30] Foreign Application Priority Data

Oct. 30, 1978 [JP] Japan ................................. 53/32510
Jun. 6, 1979 [JP] Japan ................................. 54/69931

[51] Int. Cl.³ .................. C08L 63/00; C09D 5/40; C25D 13/06
[52] U.S. Cl. ................ 260/18 EP; 106/243; 106/252; 204/181 C; 260/18 PN; 260/18 PF; 260/29.2 EP
[58] Field of Search ............. 204/181 C; 260/18 EP, 260/29.2 EP, 18 PN, 18 PF; 106/243, 252

[56] References Cited

U.S. PATENT DOCUMENTS

| | | | |
|---|---|---|---|
| 3,719,626 | 3/1973 | May | 204/181 C |
| 3,789,090 | 1/1974 | Otsuki et al. | 526/173 |
| 3,804,786 | 4/1974 | Sekmakas | 260/18 EP |
| 3,971,709 | 7/1976 | Ohsawa et al. | 204/181 C |
| 4,101,486 | 7/1978 | Bosso et al. | 204/181 C |
| 4,104,147 | 8/1978 | Marchetti et al. | 204/181 C |
| 4,134,932 | 1/1979 | Kempter et al. | 204/181 C |
| 4,138,377 | 2/1979 | Otsuki et al. | 204/181 C |
| 4,139,396 | 2/1979 | Otsuki et al. | 260/18 EP |
| 4,144,159 | 3/1979 | Bosso et al. | 204/181 C |
| 4,182,831 | 1/1980 | Hicks | 204/181 C |

FOREIGN PATENT DOCUMENTS

53/16048 2/1978 Japan .
53/117030 10/1978 Japan .

*Primary Examiner*—Ronald W. Griffin
*Attorney, Agent, or Firm*—Wenderoth, Lind & Ponack

[57] ABSTRACT

A coating composition for cathode-precipitating electrodeposition consisting essentially of (A) 100 parts by weight of an unsaturated organic compound having a molecular weight of 500 to 10,000 containing a carbon-carbon double bond in an amount corresponding to an iodine value of 100 to 500, said unsaturated organic compound having bonded thereto, through a carbon-carbon bond, basic groups of the formula

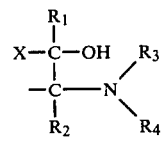

wherein $R_1$, $R_2$, $R_3$, $R_4$ and $X$ are as defined in claim 1, the amount of said basic groups in said component (A) being 0.02 to 0.3 mole per 100 g of said component (A), and (B) 3 to 100 parts by weight of at least one compound represented by the general formula

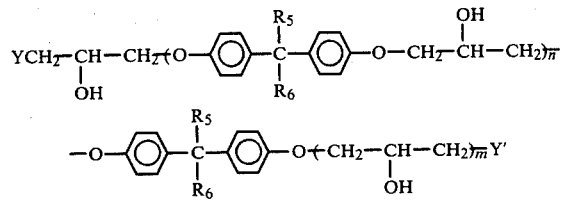

wherein $R_5$, $R_6$, n, m, Y and Y' are as defined in claim 1, said component (A) and said component (B) being neutralized with an organic acid or an inorganic acid and dissolved or dispersed in water.

7 Claims, No Drawings

CATHODE-PRECIPITATING ELECTRODEPOSITION COATING COMPOSITION

This invention relates to a coating composition for cathode-precipitating electrodeposition.

A resin having a certain basic group generates a cationic resin in water, and when used in electrodeposition, deposits on a cathode. Cathode-depositing paints of this type can remove the defect of the dissolving of a metal to be coated in a coating bath which defect is inherent to conventional anode-precipitating electrodeposition paints resulting from the watersolubilization of resins having acid groups by neutrization with bases, and can overcome the various problems attributed to this defect.

We previously studied such cathode-depositing paints, and found that a cathode-depositing resin having superior curability and film properties can be obtained by reacting a resin obtained by introducing an epoxy group into a synthetic polymer having a low degree of polymerization and containing a carbon-carbon double bond, for example a high-molecular-weight compound containing an unsaturated group such as liquid polybutadiene, with a primary amine and/or a secondary

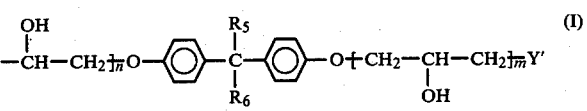

amine. This technique was applied for a patent (Japanese Laid-Open Patent Publication No. 16048/78 and Japanese Patent Application No. 31624/77).

The above cathode-precipitating resin resulting from the modification of a high molecular compound containing an unsaturated group and an epoxy group with a primary amine and/or a secondary amine gives a cathode-precipitating electrodeposition paint which will form a coated film having good properties by an ordinary baking procedure which induces mainly the oxidative polymerization of the unsaturated group. In addition, a solution of this cathode-precipitating electrodeposition paint is fully stable both at a concentration before dilution and at a low concentration after dilution. This paint, however, cannot fully meet the rigorous requirement of corrosion resistance, for example, the corrosion resistance of a paint film formed on an untreated steel sheet.

It is an object of this invention therefore to provide a cathode-precipitating electrodeposition coating composition having improved corrosion resistance.

The above object of the invention is achieved by a coating composition for cathode-precipitating electrodeposition consisting essentially of (A) 100 parts by weight of an unsaturated organic compound having a molecular weight of 500 to 10,000 containing a carbon-carbon double bond in an amount corresponding to an iodine value of 100 to 500, said unsaturated organic compound being selected from the group consisting of (a) a polymer of a conjugated diolefin containing 4 to 8 carbon atoms, (b) a copolymer of at least two conjugated diolefins containing 4 to 8 carbon atoms, (c) a copolymer of at least one conjugated diolefin containing 4 to 8 carbon atoms and a vinyl monomer having ethylenic unsaturation containing 2 to 20 carbon atoms, (d) a natural oil, (e) a natural fat and (f) a petroleum resin produced by cationic polymerization of petroleum cracking fractions containing 4 to 10 carbon atoms with a Friedel-Crafts catalyst, said unsaturated organic compound having bonded thereto, through a carbon-carbon bond, basic groups of the formula

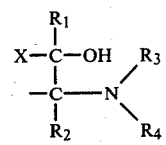

wherein $R_1$ and $R_2$, independently from each other, represent a hydrogen atom or a methyl group, $R_3$ and $R_4$, independently from each other, represent a hydrogen atom or an organic radical having 1 to 10 carbon atoms, at least one of $R_3$ and $R_4$ represents an organic radical, X represents a hydrogen atom or a bond, and when X represents a bond, the carbon atom to which $R_1$ is attached and the carbon atom to which $R_2$ is attached may form part of the main chain, the amount of said basic groups in said component (A) being 0.02 to 0.3 mole per 100 g of said component (A), and (B) 3 to 100 parts by weight of at least one compound represented by the general formula

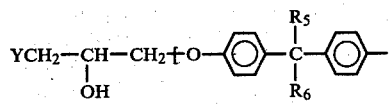

wherein $R_5$ and $R_6$, independently from each other, represent a hydrogen atom or an alkyl group having 1 to 10 carbon atoms, n is an integer of from 0 to 20, m is 1 or 0, Y is a group of the formula

in which $R'_3$ represents an organic radical having 1 to 10 carbon atoms and $R'_4$ represents a hydrogen atom or an organic radical having 1 to 10 carbon atoms, a residue of a carboxylic acid having 1 to 20 carbon atoms, or a residue of a phenolic compound having 6 to 20 carbon atoms, and Y' represents a hydrogen atom when m is 0 and Y when m is 1, said component (A) and said component (B) being neutralized with an organic acid or an inorganic acid and dissolved or dispersed in water.

The high molecular compound containing basic groups as component (A) used in this invention can be obtained as a resin having basic groups, a hydroxyl group and an unsaturated group by reacting an organic high molecular compound comprising a high molecular mainchain portion having a molecular weight of 500 to 10,000 and an iodine value of 100 to 500 and containing a carboncarbon double bond and bonded to the high molecular mainchain portion, epoxy groups of the general formula

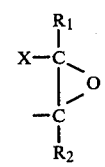

wherein X, $R_1$, and $R_2$ are as defined above, said epoxy groups being contained in a proportion of 0.2 to 0.6 mole, preferably 0.05 to 0.3 mole, per 100 g of the organic high molecular compound; with a primary amine and/or a secondary amine of the general formula

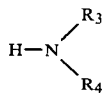

wherein $R_3$ and $R_4$ each represent a hydrogen atom or an organic radical having 1 to 10 carbon atoms, preferably a hydrocarbon group having 1 to 10 carbon atoms which may partially be substituted by a hydroxyl group, and at least one of $R_3$ and $R_4$ is an organic radical, preferably said hydrocarbon radical.

The main-chain portion of the resin used in this invention is derived from a high molecular compound having a number average molecular weight (to be referred to simply as molecular weight) of 500 to 10,000 which has an iodine value of 100 to 500, preferably 200 to 450 and contains a carbon-carbon double bond.

Examples of such a high molecular compound include natural oils and fats such as linseed oil, tung oil, soybean oil or dehydrated castor oil, stand oils prepared by heat-treating such natural oils and fats to increase their molecular weights, polymers of low degrees of polymerization of conjugated diolefins such as butadiene, isoprene and piperylene, copolymers of low degrees of polymerization of at least two of these conjugated diolefins, and copolymers of low degrees of polymerization derived from at least one of these conjugated diolefins and an ethylenically unsaturated monomer, especially an aliphatic or aromatic vinyl monomer such as isobutylene, diisobutylene, styrene, alpha-methylstyrene, vinyltoluene and divinylbenzene. Mixtures of two or more of these with one another can also be used.

These polymers with low degrees of polymerization can be produced by known conventional methods. A typical method comprises the anionic-polymerization of conjugated diolefins containing 4 or 5 carbon atoms either alone, or as mixtures with each other, or preferably with an aromatic vinyl monomer such as styrene, α-methylstyrene, vinyltoluene or divinylbenzene in an amount of not more than 50 mole% at a temperature of 0° to 100° C. in the presence of an alkali metal or organic alkali metal compound as a catalyst. In order to control the molecular weight and obtain a light-colored low polymer with a reduced gel content, it is convenient to employ a chain-transfer polymerization method using an organic alkali metal compound such as benzyl sodium as a catalyst and a compound containing an alkylaryl group such as toluene as a chain-transfer agent (U.S. Pat. No. 3,789,090), a living polymerization method carried out in a tetrahydrofuran solvent using a polynuclear aromatic compound such as naphthalene as an activator and an alkali metal such as sodium as a catalyst (Japanese Patent Publications Nos. 17485/67 and 27432/68), and a method in which an aromatic hydrocarbon such as toluene or xylene is used as a solvent and a dispersion of a metal such as sodium in an organic solvent is used as a catalyst, and the molecular weight of the polymer is controlled by adding an ether such as dioxane (Japanese Patent Publications Nos. 7446/57, 1245/58, and 10188/59). The polymers having a low degree of polymerization can also be produced by coordination anionic polymerization using an acetylacetonate compound of a metal of Group VIII of the periodic table, such as cobalt or nickel, and an alkylaluminum halogenide as catalysts (Japanese Patent Publications Nos. 507/70 and 30300/71).

Furthermore, petroleum resins having an unsaturated group produced by cationic polymerization of petroleum cracking fractions containing 4 to 10 carbon atoms with a Friedel-Crafts catalyst such as aluminum chloride, boron trifluoride or a complex of these at 0° to 100° C., and a butadiene/isobutylene copolymer having a low degree of polymerization and prepared by using a similar catalyst can also be used as the main chain portion of the resins used in the present invention.

The natural oils and fats and the polymer or copolymers of conjugated diolefins exemplified above have a molecular weight of 500 to 10,000, preferably 1,000 to 5,000. If the molecular weight is larger than 10,000, these compounds have poor solubility in water, and if it is less than 500, coatings obtained from these compounds have too low a strength to be practical.

The above natural oils and fats and the conjugated diolefin polymers or copolymers having low degrees of polymerization have an iodine value of 100 to 500, preferably 200 to 450. If the iodine value is less than 100, the curability of these compounds is poor, and if it exceeds 500, they have poor storage stability.

The "iodine value", as referred to in the present application, is measured by the following method disclosed in A. Kemp and H. Peters, Ind. Eng. Chem. Anal. Ed. 15, 453 (1943). About 0.1 g of a sample is collected in a 500 ml flask for iodine value measurement, and 100 ml of chloroform and 100 g of p-dichlorobenzene are added to dissolve the sample. Then, 60 ml of a 0.1 N carbon tetrachloride solution of iodine monochloride is added, and reacted with the sample by shaking at room temperature for 1 hour. Then, 10 ml of a 10% aqueous solution of potassium iodide is added, and the mixture is shaken for 5 minutes. The resulting solution is then titrated with a 0.1 N aqueous solution of sodium thiosulfate using starch powder as an indicator.

Introduction of the epoxy groups of the general formula

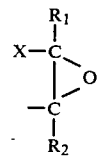

wherein $R_1$, $R_2$ and X are as defined hereinabove, into the aforesaid natural oils and fats or conjugated diolefin polymers or copolymers can be performed, for example, by utilizing conventional known methods which involves reacting these compounds with peracetic acid at a temperature of 0° to 100° C. (Japanese Patent Publications Nos. 3239/58, 3240/58 and 15107/62).

The amount of the epoxy groups of the above formula is 0.02 to 0.6 mole, preferably 0.05 to 0.3 mole, per 100 g of the organic high molecular compound. If the amount of the epoxy groups is smaller than 0.02 mole per 100 g of the high molecular compound, the resin obtained by reaction with the primary or secondary amine has poor solubility even when neutralized with an acid. On the other hand, if the amount of the epoxy groups is larger than 0.6 mole, the resin has exceedingly high solubility in water as a result of the neutralization treatment, and has poor resistance when painted, so that it is not practical.

Examples of the primary or secondary amine compound of the general formula

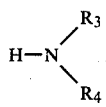

include aliphatic primary amines such as monomethylamine, monoethylamine, monopropylamine, monobutylamine, monohexylamine and monoctylamine; aromatic primary amines such as benzylamine; primary alkanolamines such as monoethanolamine and monopropanolamine; aliphatic secondary amines such as dimethylamine, diethylamine, dibutylamine and dioctylamine; and secondary alkanolamines such as diethanolamine and dipropanolamine. $R_3$ and $R_4$ in the above formula are preferably hydrogen, alkyl groups and alkanol groups. These primary and secondary amines may be used singly or as a mixture.

The reaction of the high molecular compound containing epoxy groups and a carbon-carbon double bond with the primary or secondary amine is performed at a temperature of 50° to 200° C., preferably 100° to 150° C. in the presence or absence of a solvent. When the high molecular compound has a low viscosity, it is preferred not to use a solvent. When the viscosity of the high molecular compound is high, there may be used a solvent such as benzene, toluene, xylene, cyclohexane, methyl "Cellosolve" (ethylene glycol monomethyl ether), ethyl "Cellosolve" (ethylene glycol monoethyl ether), propyl "Cellosolve" (ethylene glycol monopropyl ether), butyl "Cellosolve" (ethylene glycol monobutyl ether), diethyl ether, glyme, and diglyme.

When the solvent is used, it is preferred economically to use a water-soluble solvent such as ethyl "Cellosolve", methyl "Cellosolve", butyl "Cellosolve", glyme or diglyme as a reaction solvent, and directly water-solubilize the product.

The aforesaid reaction between the organic high molecular compound having epoxy groups and a carboncarbon double bond and the primary and/or secondary amine compound can be promoted by adding water, phenol or an acid such as acetic acid as a catalyst.

In this way, a high molecular resin (A) can be obtained which contains 0.02 to 0.3 mole, per 100 g of the high molecular compound, of basic groups of the general formula

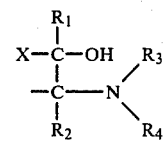

wherein $R_1$, $R_2$, $R_3$, $R_4$ and X are as defined hereinabove, and a carbon-carbon double bond and has a molecular weight of 500 to 10,000 and an iodine value of 100 to 500.

The novel aspect of this invention is that the electrodeposition coating composition contains, in addition to the component (A), a component (B) which is at least one compound represented by the general formula

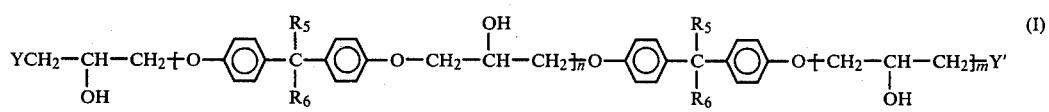

wherein $R_5$ and $R_6$, independently from each other, represent a hydrogen atom or an alkyl group having 1 to 10 carbon atoms, n is an integer of from 0 to 20, m is 1 or 0, Y is a group of the formula

in which $R'_3$ represents an organic radical having 1 to 10 carbon atoms and $R'_4$ represents a hydrogen atom or an organic radical having 1 to 10 carbon atoms, a residue of a carboxylic acid having 1 to 20 carbon atoms, or a redidue of a phenolic compound having 6 to 20 carbon atoms, and Y' represents a hydrogen atom when m is 0 and Y when m is 1. By the inclusion of the component (B), there can be obtained an electrodeposition paint having markedly improved corrosion resistance while retaining the excellent curability and film properties of the conventional cathode-depositing electrodeposition paint containing the component (A) as an essential ingredient.

The proportion of the component (B) is 3 to 100 parts by weight, preferably 10 to 50 parts by weight, of the resin (A). If the proportion of the component (B) is less than the specified limit, the corrosion resistance of a coated film prepared from the resulting composition cannot be fully improved. If it is less than the lower limit specified, the solvent resistance and physical properties of coated films prepared from the resulting composition will be deteriorated.

The compound (B) is prepared from a glycidyl compound of the general formula

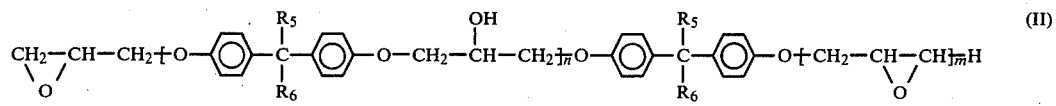

wherein $R_5$ and $R_6$ represent a hydrogen atom or an alkyl group having 1 to 10 carbon atoms, preferably a methyl or ethyl group, n is an integer from 0 or 20, preferably from 1 to 5, and m is 0 or 1, preferably 1. This glycidyl compound can usually be obtained by etherifying a bisphenol compound with epichlorohydrin in the presence of an alkali. Examples of the bisphenol compound are 2,2-bis(4'-hydroxyphenyl)propane, 1,1-bis(4'-hydroxyphenyl)ethane, and 1,1-bis(4'-hydroxyphenyl)isobutane. In many cases, a glycidyl compound having a somewhat higher molecular weight, which is prepared by reacting the aforesaid glycidyl ether with a bisphenol, etc., and then reacting the reaction product with epichlorohydrin, can be used in this invention.

The aforesaid glycidyl compound is reacted with a primary or secondary amine, a carboxylic acid or a phenolic compound at a temperature of 0° to 200° C., preferably 50° to 150° C. to obtain a compound of formula (I) in which Y represents

(in which R'$_3$ and R'$_4$ are as defined hereinabove), a residue of a carboxylic acid having 1 to 20 carbon atoms, or a residue of a phenolic compound having 6 to 20 carbon atoms. Generally, the reaction does not require a catalyst. But in the case of the reaction with the carboxylic acid or phenolic compound, a suitable catalyst, such as a tertiary amine or quaternary ammonium base, may be used. The reaction can be performed in the presence or absence of a solvent. When the solvent is used, the same solvents as used in the production of the resin (A) can be used.

In the reaction of the glycidyl compound of formula (II) with a primary or secondary amine, the same primary or secondary amines as used in the production of the resin (A) can be used. Specifically, the primary or secondary amine used is expressed by the following general formula

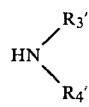

wherein R'$_3$ represents an organic radical having 1 to 10 carbon atoms, preferably a hydrocarbon radical having 1 to 10 carbon atoms a part of which may be substituted by a hydroxyl group, and R'$_4$ represents a hydrogen atom, or an organic radical having 1 to 10 carbon atoms, preferably the aforesaid hydrocarbon radical.

In the present invention, the reaction of the glycidyl compound with the primary or secondary amine should be performed such that substantially all of the groups

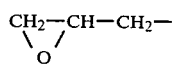

in the molecules of the glycidyl compound react with the amine to change to groups of the formula:

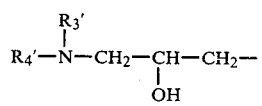

If substantial amounts of the groups

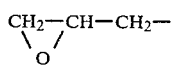

remain, these groups would undesirably react with the basic groups of the resin (A) at the time of water-solubilization with an acid, thereby causing gellation. As a result, the components (A) and (B) would have too high a viscosity to be water-solubilized. Even if water-solubilization can be effected, the aqueous solution would change with time, and uniform electrodeposition charateristics, or electrodeposited films, would not be obtainable.

When a secondary amine is used, the following amine compound forms by the following reaction.

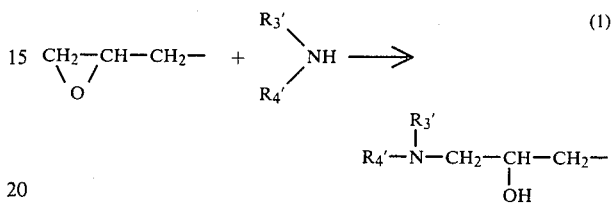

When a primary amine is used, the following amine compound forms by the following reaction.

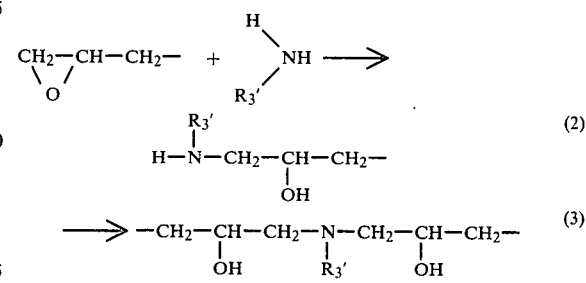

Even when the compound of formula (3) is formed as a by-product in some amount, for example in an amount less than half of the amount of the compound of formula (2), the resulting product can be applied to the present invention.

In the present invention, secondary amines are preferably used. The amount of the secondary amine is about 1 to 2.0 moles, preferably 1 to 1.2 moles, per mole of the groups

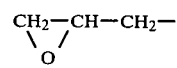

of the glycidyl compound. When a primary amine is to be used, its amount is about 0.75 to 2.0 moles, preferably 1 to 1.2 moles. In either case, the excess of the amine is desirably removed by distillation, etc. after the reaction.

The reaction of the glycidyl compound of formula (II) with the carboxylic acid or phenolic compound can be carried out under similar temperature, catalyst and solvent conditions to those in the reaction of the glycidyl compound with the primary or secondary amine.

The carboxylic acid used is a saturated or unsaturated aliphatic, aromatic or cycloaliphatic carboxylic acid of the formula

wherein Z is a residue of a carboxylic acid having 1 to 20 carbon atoms. Examples are acetic acid, propionic acid, benzoic acid and maleic acid. Preferred carboxylic acids are unsaturated aliphatic carboxylic acids having 3 or 4 carbon atoms such as acrylic acid, methacrylic acid and crotonic acid. Mixtures of these carboxylic acids can also be used.

The phenolic compound used is a compound containing a phenolic hydroxyl group which is represented by the formula $$Z'-OH$$

wherein Z' represents a residue of a phenolic compound having 6 to 20 carbon atoms. Examples are phenol, cresol and xylenol. Mixtures of these can also be used.

When acrylic acid is used as the carboxylic acid, the aforesaid reaction proceeds in accordance with the following scheme.

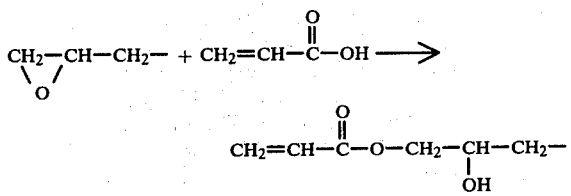

In the reaction of the glycidyl compound with the carboxylic acid or phenolic compound as in the reaction with the primary or secondary amine, it is necessary that substantially, all of the groups

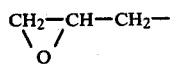

of the glycidyl compound should react with the unsaturated carboxylic acid to change to groups of the formula

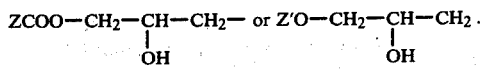

If the aforesaid glycidyl groups remain in substantial amounts, the same difficulty as in the case of reacting the primary or secondary amine would arise.

As compound (B), an amine compound of the above-given formula in Y is

(in which R'$_3$ and R'$_4$ are as defined above) [to be referred to as compound (B')], and a compound of the above-given formula in which Y is a residue of a carboxylic acid having 1 to 20 carbon atoms (i.e., Z) or a residue of a phenolic compound having 6 to 20 carbon atoms (i.e., Z') [to be referred to as compound (B'')] may be used in combination.

Bisphenol-type epoxy resins have been known to have superior corrosion resistance. To render these resins crosslinkable, attempts have been made to leave some of the epoxy groups (Japanese Patent Publication Nos. 23807/74 and 15860/76), or to use blocked isocyanate compounds as a crosslinking agent. To obtain practical hardness, however, paints prepared from these resins require a high baking temperature of, say, more than 200° C. Even when they are curable at relatively low temperatures, the baking temperatures can be selected only from a narrow range.

Under practical electrodeposition conditions, the bisphenol-type epoxy resins must be of somewhat high molecular weight, and naturally the resulting coating film tends to be devoid of flexibility. Furthermore, if a blocked isocyanate is used for a resin having a carbon-carbon double bond, the oxidative polymerization at the time of baking will be inhibited, and a coated film having sufficient performance may not be obtained.

It is indeed surprising therefore that in accordance with the invention the compound (B) resulting from the conversion of substantially all of the groups

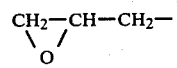

of the glycidyl compound into the groups

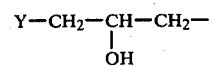

wherein Y is

in which R'$_3$ and R'$_4$ are as defined above, a residue of a carboxylic acid having 1 to 20 carbon atoms, or a residue of a phenolic compound having 6 to 20 carbon atoms can be used as one component of a cathode-precipitating electrodeposition paint together with the component (A), and as a result, the corrosion resistance of the resin (A) can be markedly improved without any deleterious effect on its excellent curability and film properties.

When the compound (B') is used as component (B) in this invention, the production of forming the resin (A) by reacting the organic high molecular compound having epoxy groups and unsaturated groups with a primary or secondary amine and the production of the amine compound (B') by reacting the aforesaid glycidyl compound with a primary or secondary amine are effected under much the same reaction conditions. It is possible therefore to mix the organic high molecular compound and the glycidyl compound, react the mixture with the amine to form the resin (A) and the compound (B') simultaneously, and to subject a mixture of these to the subsequent neutralization step. This method may be advantageously used when a secondary amine is used as the amine compound.

In the present invention, the resin (A) and the compound (B) are conveniently dissolved or dispersed in water by neutralizing them with 0.1 to 2.0 mole equivalents, preferably 0.2 to 1.0 mole equivalent, to the basic group, of an inorganic acid such as hydrochloric acid or sulfuric acid or a water-soluble organic acid such as formic acid, acetic acid, propionic acid or lactic acid. The resin (A) and the compound (B) may be neutralized separately, and the resulting aqueous solutions or aqueous dispersion may be combined. Alternatively, the two may be first mixed, and then neutralized.

The neutralization is achieved by simply mixing the resin (A) and/or the compound (B) with the acid.

If required, a dryer may be added to a composition obtained by dissolving or dispersing the resin (A) and the compound (B) in water. The dryer may, for example, be any of salts of metals such as manganese, cobalt, zinc or lead, and water-soluble manganese compounds are most suitable. Examples of the manganese compounds are manganese salts of organic acids having a relatively low molecular weight such as manganese formate, manganese acetate, manganese propionate and manganese lactate, manganese salts of inorganic acids such as manganese s sulfate, manganese chloride, manganese nitrate, and acetylacetonatomanganese. The amount of the manganese compound is 0.01 to 5.0 parts by weight, preferably 0.1 to 1.0 parts by weight, as manganese metal per 100 parts by weight of the resin (A), In dissolving or dispersing the resin (A) and the compound (B) in water after neutralization, a water-soluble organic solvent capable of dissolving the resin (A) and the compound (B) is preferably added in order to facilitate the dissolution or dispersion, improve the flowability of the resin, and improve the smoothness of paint films. Examples of such an organic solvent are ethyl Cellosolve, propyl Cellosolve, butyl Cellosolve, ethylene glycol dimethyl ether, diethylene glycol dimethyl ether, diacetone alcohol, 4-methoxy-4-methylpentanone-2, and methyl ethyl ketone. The amount of the organic compound is 10 to 100 parts by weight per 100 parts by weight of the sum of the components (A) and (B).

Suitable pigments may also be incorporated into the cathode-precipitating electrodeposition coating composition of this invention. For example, at least one of iron oxide, lead oxide, strontium chromate, carbon black, titanium dioxide, talc, aluminum silicate, and barium sulfate can be used.

These pigments may be added directly to the composition of this invention. Alternatively, it is possible to mix a large amount of a pigment to a portion of an aqueous dispersion or solution of the resin (A) and/or [compound (B)] obtained after neutralization to obtain a paste-like master batch, and to add this batch to the composition of this invention.

The following Examples and Comparative Examples illustrate the present invention more specifically. In these examples, tests for the properties of coated films were conducted in accordance with JIS K-5400.

EXAMPLE 1

(1) Liquid polybutadiene having a number average molecular weight of 1,000, a viscosity at 25° C. of 15 poises and a 1,2-bond content of 60%, which had been obtained by polymerizing butadiene to a low degree of polymerization at 30° C. using benzyl sodium as a catalyst in the presence of toluene as a chain transfer agent, was epoxidized with peracetic acid to afford epoxidized polybutadiene having an oxirane oxygen content of 3.5% by weight.

A 3-liter separable flask equipped with a reflux condenser was charged with 1,230 g of the resulting epoxidized polybutadiene, 426 g of diethanolamine and 24.6 g of phenol, and they were reacted at 180° C. for 5 hours. The unreacted materials were distilled off under reduced pressure to afford polybutadiene containing amino groups and having an amine value of 100.

Three hundred (300) grams of the amino-containing polybutadiene thus obtained was dissolved in 60 g of butyl Cellosolve, and then neutralized with 32.2 g of lactic acid. Deionized water was added to afford an aqueous solution having a solids concentration at 20% by weight.

Six hundred (600) grams of the resulting aqueous solution, 190 g of titania, 3.6 g of carbon black, 106.5 g of aluminum silicate and 900 g of glass beads were placed in a 2-liter stainless steel beaker, and vigorously stirred by a high-speed rotary mixer for 2 hours. The glass beads were removed by filtration to afford a pigment paste having good water dispersibility.

(2) A mixture of 883 g of epoxidized polybutadiene having an oxirane oxygen content of 2.7% by weight synthesized from the liquid polybutadiene having a number average molecular weight of 1,000 used in (1) above, 234 g of diethanolamine and 17.7 g of phenol was reacted at 180° C. for 5 hours. The unreacted materials were distilled off under reduced pressure to afford amino-containing polybutadiene having an amine value of 80 [resin (A$_1$)].

(3) Separately, 300 g of a compound of the following formula

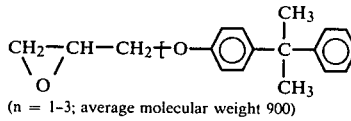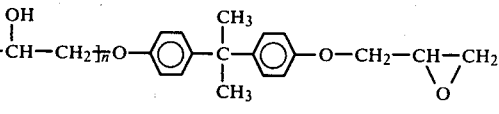

(n = 1-3; average molecular weight 900)

obtained by reacting bisphenol A with epichlorohydrin in the presence of an alkaline catalyst, and 60 g of diethanolamine were reacted at 80° C. for 4 hours in the presence of 180 g of butyl Cellosolve to convert substantially all of the terminal groups

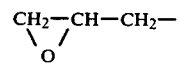

to groups of the formula

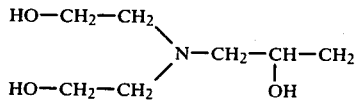

and thus to obtain an amine compound [compound (B$_1$)].

(4) One hundred and fifty (150) grams of the resin (A$_1$) obtained in (2) and 30 g of the compound (B$_1$) obtained in (3) were dissolved in 26 g of butyl Cellosolve, and neutralized with 12.9 g of lactic acid. Deionized water was added to afford an aqueous solution having a solids concentration of 20% by weight. To the 20% by weight aqueous solution was added 150 g of the pigment paste prepared in (1) above. They were fully stirred, and deionized water having dissolved therein 6.7 g of manganese lactate

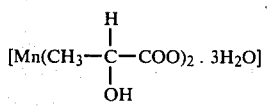

was added to afford an electrodeposition coating solution having a solids concentration of 15% by weight.

The resulting electrodeposition coating solution was electrodeposited on an untreated steel panel [G. 3141 (SPCC-SD), 0.6×70×150 mm, a product of Nippon Test Panel Co., Ltd.] as a cathode using a carbon electrode as an anode. The results are shown in Table 1.

EXAMPLE 2

(1) Four hundred (400) grams of a glycidyl compound of the formula

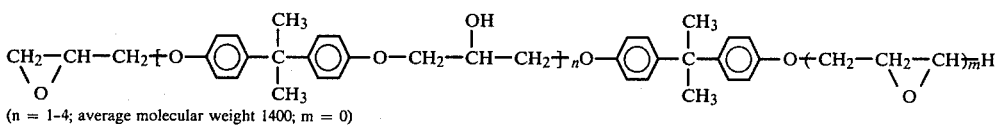

(n = 1-4; average molecular weight 1400; m = 0)

obtained by reacing bisphenol A with epichlorohydrin in the presence of an alkaline catalyst, and 49 g of dibutylamine were reacted at 80° C. for 4 hours in the presence of 225 g of butyl Cellosolve to convert all of the terminal groups of the above glycidyl compound to groups of the formula

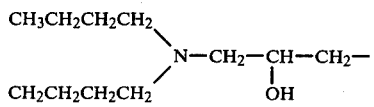

and to obtain an amine compound [compound $(B_2)$].

(2) One hundred and fifty (150) grams of the resin $(A_1)$ synthesized in Example 1, (2) and 30 g of the compound $(B_2)$ obtained in (1) above were dissolved in 26 g of butyl Cellosolve, and then neutralized with 12.9 g of lactic acid. Deionized water was added to prepare an aqueous solution having a solids concentration of 20% by weight. To the 20% by weight aqueous solution was added 150 g of the pigment paste obtained in Example 1, (1). They were fully stirred, and then deionized water having dissolved therein 6.7 g of manganese lactate was added to prepare an electrodeposition coating solution having a solids concentration of 15% by weight.

Electrodeposition was performed from the resulting coating solution by the same operation as in Example 1. The results are shown in Table 1.

EXAMPLE 3

(1) Liquid polybutadiene having a number average molecular weight of 2,000, a viscosity at 25° C. of 120 poises and a 1,2-bond content of 65%, which had been obtained by polymerizing butadiene to a low degree of polymerization at 30° C. using benzyl sodium as a catalyst in the presence of toluene as a chain transfer agent, was epoxidized with peracetic acid to afford epoxidized polybutadiene having an oxirane oxygen content of 1.9% by weight.

A 3-liter separable flask equipped with a reflux condenser was charged with 902 g of the resulting epoxidized polybutadiene, 171 g of diethanolamine and 18 g of phenol, and they were reacted at 180° C. for 5 hours. The unreacted materials were distilled off under reduced pressure to afford an amino-containing polybutadiene resin having an amine value of 60 $(A_2)$.

(2) One hundred and fifty (150) grams of the resin $(A_2)$ obtained in (1) above and 30 g of the amine compound $(B_1)$ synthesized in Example 1, (3) were dissolved in 26 g of butyl Cellosolve, and then neutralized with 9.7 g of lactic acid. Deionized water was added to prepare an aqueous solution having a solids concentration of 20% by weight. To the 20% aqueous solution was added 150 g of the pigment paste prepared in Example 1, (1), and they were fully stirred. Then, deionized water having dissolved therein 6.7 g of manganese lactate was added to prepare an electrodeposition coating solution having a solids concentration of 15% by weight.

Electrodeposition was performed from the resulting coating solution by the same operation as in Example 1. The results are shown in Table 1.

COMPARATIVE EXAMPLE 1

One hundred and fifty (150) grams of the resin $(A_1)$ synthesized in Example 1, (2) was dissolved in 30 g of butyl Cellosolve, and then neutralized with 12.9 g of lactic acid. Deionized water was added to prepare a 20% by weight aqueous solution. To the aqueous solution was added 125 g of the pigment paste prepared in Example 1, (1), and a solution of 5.6 g of manganese lactate in deionized water was also added to prepare an electrodeposition coating solution having a solids concentration of 15% by weight.

Electrodeposition coating was performed from the resulting coating solution by the same operation as in Example 1. The results are shown in Table 1.

COMPARATIVE EXAMPLE 2

One hundred and fifty (150) grams of the resin $(A_2)$ synthesized in Example 3, (1) was dissolved in 30 g of butyl Cellosolve, and neutralized with 9.7 g of lactic acid. By the same procedure as in Comparative Example 1, the pigment paste and manganese lactate were added to prepare an electrodeposition coating solution having a solids concentration of 15% by weight. Electrodeposition coating was performed from the resulting coating solution by the same operation or in Example 1. The results are shown in Table 1.

COMPARATIVE EXAMPLE 3

One hundred and fifty (150) grams of the amine compound $(B_1)$ synthesized in Example 1, (3) was dissolved in 30 g of butyl Cellosolve, and neutralized with 14.3 g of lactic acid. Deionized water was added to prepare an aqueous solution having a solids concentration of 12% by weight.

Electrodeposition was performed from the resulting aqueous solution by the same operation as in Example 1. When the resulting coated film was baked at 180° C. for 30 minutes, the film was smooth and tack-free. When the coated film was dipped in a solvent such as xylene, it was dissolved, and became useless.

It is clearly seen from Examples 1, 2 and 3 and Comparative Examples 1 and 2 that a cathode-precipitating electrodeposition coating composition consisting essentially of a resin composed of an amino-containing polybutadiene [component (A)] and a specified amine compound [component (B)] obtained by reacting a glycidyl compound with an amine exhibits a markedly improved corrosion resistance on a non-treated steel plate without impairing the excellent film properties of the resin (A). It is also seen from Comparative Example 3 that the component (B) alone cannot give a practical coated film.

of butyl Cellosolve, and then neutralized with 12.9 g of lactic acid. Deionized water was added to prepare an aqueous solution having a solids concentration of 20% by weight. To the 20% by weight aqueous solution was added 150 g of the pigment paste obtained in Example 1, (1), and the mixture was well stirred. Then, deionized water having dissolved therein 6.7 g of manganese lactate was added to prepare an electrodeposition coating solution having a solids concentration of 15% by weight. Electrodeposition was performed from the re-

TABLE 1

|  | Example 1 | Example 2 | Example 3 | Comparative Example 1 | Comparative Example 2 |
|---|---|---|---|---|---|
| Coating conditions |  |  |  |  |  |
| Voltage (V) | 150 | 150 | 200 | 150 | 150 |
| Time (minutes) | 3 | 3 | 3 | 3 | 3 |
| Baking conditions (temperature (°C.) × time (minutes)) | 180 × 30 | 180 × 30 | 180 × 30 | 180 × 30 | 180 × 30 |
| Coated thickness (microns) | 20 | 20 | 19 | 19 | 20 |
| Physical tests |  |  |  |  |  |
| Pencil hardness | 2H | 2H | 2H | H | 2H |
| Sketching | Good | Good | Good | Good | Good |
| Crosscut tape test | 100/100 | 100/100 | 100/100 | 100/100 | 100/100 |
| Erichsen (mm) | >7 | >7 | >7 | >7 | >7 |
| Impact strength (cm) (*1) |  |  |  |  |  |
| Top surface | >50 | >50 | >50 | >50 | >50 |
| Back surface | >50 | >50 | >50 | >50 | >50 |
| Chemical tests |  |  |  |  |  |
| Alkali resistance (hours) (*2) | >60 | >60 | >60 | >60 | >60 |
| Acid resistance (hours) (*3) | >24 | >24 | >24 | >24 | >24 |
| Solvent resistance (hours) (*4) | >24 | >24 | >24 | >24 | >24 |
| Water resistance (days) (*5) | >30 | >30 | >30 | >30 | >30 |
| Corrosion resistance (*6) |  |  |  |  |  |
| 48 hours | ⊚ | ⊚ | ⊚ | Δ | Δ |
| 240 hours | ⊚ | ⊚ | ○ | X | X |

(*1) The maximum height of a ball fall which does not cause the breakage of the coated film (500 g, ½ B).
(*2) The time that elapses until a change, such as blistering, occurs in the coated film (when immersed in 5% NaOH).
(*3) The time that elapses until a change, such as blistering, occurs in the coated film (when immersed in 5% $H_2SO_4$).
(*4) The time that elapses until a change, such as blistering, occurs in the coated film (when immersed in a 1:1 mixture of toluene and xylene).
(*5) The time that elapses until a change, such as blistering, occurs in the coated film (when immersed in pure water at 40° C.).
(*6) The maximum rust width (mm) from a cut portion provided in the coated film (a spray of a 5% aqueous solution of NaCl). Evaluated on the following scale.
⊚:less than 1 mm
○:1 to 2 mm
Δ:more than 2 mm to 3 mm
X:more than 3 mm

EXAMPLE 4

(1) One thousand (1,000) grams of a bisphenol-type epoxy resin (Epikote 1001, a product of Shell Chemical Co.) having an epoxy equivalent of 500 and the following formula

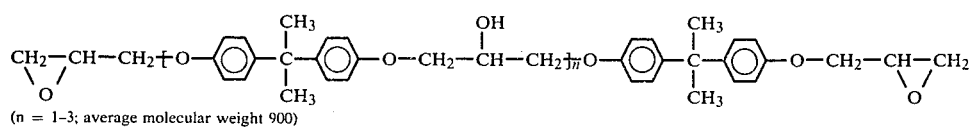

(n = 1-3; average molecular weight 900)

which had been obtained by reacting bisphenol A with epichlorohydrin in the presence of an alkaline catalyst was dissolved in 227 g of butyl Cellosolve, and 137 g of acrylic acid, 0.2 g of hydroquinone and 5 g of N,N-dimethylaminoethanol were added. The mixture was heated to 100° C. for 5 hours to prepare a butyl Cellosolve solution of an epoxy resin/acrylic acid adduct [compound ($B_3$)] having a residual epoxy content of 0 and an acid value of 0.2 mg KOH/g.

(2) One hundred and fifty (150) grams of the resin ($A_1$) obtained in Example 1, (2) and 50 g of the compound ($B_3$) obtained in (1) above were dissolved in 30 g sulting coating solution by the same operation as in Example 1. The test results are shown in Table 2.

EXAMPLE 5

One hundred and fifty (150) grams of the amine-containing polybutadiene resin ($A_2$) synthesized in Example 3, (1) and 50 g of the compound ($B_3$) synthesized in Example 4, (1) were dissolved in 22 g of butyl Cellosolve, and then neutralized with 9.7 g of lactic acid. Deionized water was added to prepare an aqueous solution having a solids concentration of 20% by weight. To the 20% by weight aqueous solution was added 150 g of the pigment paste prepared in Example 1, (1). The mixture was fully stirred, and then deionized water having dissolved therein 6.7 g of manganese lactate was added to prepare an electrodeposition coating solution having a solids concentration of 15% by weight.

Electrodeposition was performed from the resulting coating solution by the same operation as in Example 1. The results are shown in Table 2.

EXAMPLE 6

(1) One thousand (1,000) grams of a bisphenol-type epoxy resin (Epikote 1001) having an epoxy equivalent of 500 was dissolved in 233 g of butyl Cellosolve, and 164 g of methacrylic acid, 0.2 g of hydroquinone and 5 g of N,N-dimethylaminoethanol were added. The mixture was subjected to the same reaction conditions as in Example 4, (1) to afford a butyl Cellosolve solution of an epoxy resin/methacrylic acid adduct [compound ($B_4$)].

(2) One hundred and fifty (150) grams of the amino-containing polybutadiene resin ($A_2$) prepared in Example 3, (1) and 50 g of the compound ($B_4$) obtained in (1) above were dissolved in 30 g of butyl Cellosolve, and then neutralized with 9.7 g of lactic acid. Deionized water was added to prepare an aqueous solution having a solids concentration of 20% by weight. To the 20% by weight aqueous solution was added 150 g of the pigment paste produced in Example 1, (1), and the mixture was stirred well. Deionized water having 6.7 g of manganese lactate dissolved therein was added to prepare an electrodeposition coating solution having a solids concentration of 15% by weight.

Electrodeposition was performed from the resulting coating solution by the same operation as in Example 1. The results are shown in Table 2.

EXAMPLE 7

(1) One thousand (1,000) grams of a bisphenol-type epoxy resin (Epikote 1004, a product of Shell Chemical Co.) having an epoxy equivalent of 1,000 was dissolved in 214 g of butyl Cellosolve, and 69 g of acrylic acid, 0.1 g of hydroquinone and 5 g of N,N-dimethylaminoethanol were added. The mixture was subjected to the same reaction conditions as in Example 4, (1) to afford a butyl Cellosolve solution of an epoxy resin/acrylic acid adduct [compound ($B_5$)].

(2) One hundred and fifty (150) grams of the amino-containing polybutadiene resin prepared in Example 3, (1) and 50 g of the compound ($B_5$) obtained in (1) above were dissolved in 30 g of butyl Cellosolve, and neutralized with 9.7 g of lactic acid. Deionized water was added to prepare an aqueous solution having a solids concentration of 20% by weight. To the 20% by weight aqueous solution was added 150 g of the pigment paste prepared in Example 1, (1). The mixture was fully stirred, and deionized water having 6.7 g of manganese lactate dissolved therein was added to prepare an electrodeposition coating solution having a solids concentration of 15% by weight.

Electrodeposition was performed from the resulting coating solution by the same operation as in Example 1. The results are shown in Table 2.

EXAMPLE 8

(1) Six hundred (600) grams of a bisphenol-type epoxy resin having an epoxy equivalent of 500 and 330 g of linseed fatty acid (L-70, acid value 193.1 mg KOH/g) were dissolved in 186 g of butyl Cellosolve, and 3 g of N,N-dimethylaminoethanol was added. The mixture was maintained at 110° C. for 4 hours to afford a compound ($B_6$).

(2) One hundred and fifty (150) grams of the amino-containing polybutadiene prepared in Example 3, (1) and 70 g of the compound ($B_6$) obtained in (1) above were dissolved in 30 g of butyl Cellosolve, and neutralized with 9.7 g of lactic acid. By the same operation as in Example 7, the pigment paste and manganese lactate were added to prepare an electrodeposition coating solution having a solids concentration of 15% by weight.

Electrodeposition was performed from the resulting coating solution by the same operation as in Example 1. The results are shown in Table 2.

EXAMPLE 9

(1) Eight hundred (800) grams of a bisphenol-type epoxy resin having an epoxy equivalent of 500 and 91.3 g of acetic acid were dissolved in 178 g of butyl Cellosolve, and 4 g of N,N-dimethylaminoethanol was added. The mixture was maintained at 110° C. for 6 hours to afford a compound ($B_7$).

(2) Fifty (50) grams of the resulting compound ($B_7$) was dissolved in 30 g of butyl Cellosolve, and neutralized with 9.7 g of lactic acid. By the same operation as in Example 7, the pigment paste and manganese lactate were added to prepare an electrodeposition coating solution having a solids concentration of 15% by weight.

Electrodeposition was performed from the resulting coating solution by the same operation as in Example 1. The results are shown in Table 2.

It is seen from Comparative Examples 4 to 9 that a cathode-depositing electrodeposition coating composition consisting essentially of a resin composed of an amino-containing polybutadiene [component (A)] and a specified compound [component (B)] obtained by reacting a glycidyl compound with a carboxylic acid exhibits a markedly improved corrosion resistance on a non-treated steel plate without impairing the excellent film properties of the resin (A). The improvement is especially outstanding when an unsaturated carboxylic acid is used.

TABLE 2

|  | Example 4 | Example 5 | Example 6 | Example 7 | Example 8 | Example 9 |
|---|---|---|---|---|---|---|
| Coating conditions |  |  |  |  |  |  |
| Voltage (V) | 150 | 200 | 200 | 200 | 150 | 200 |
| Time (minutes) | 3 | 3 | 3 | 3 | 3 | 3 |
| Baking conditions [temperature (°C.) × time (minutes)] | 180 × 30 | 180 × 30 | 180 × 30 | 180 × 30 | 180 × 30 | 180 × 30 |
| Coated thickness (microns) | 20 | 20 | 19 | 20 | 19 | 20 |
| Physical tests |  |  |  |  |  |  |
| Pencil hardness | 2H | 2H | 2H | 2H | H | 2H |
| Sketching | Good | Good | Good | Good | Good | Good |
| Crosscut tape test | 100/100 | 100/100 | 100/100 | 100/100 | 100/100 | 100/100 |
| Erichsen (mm) | >7 | >7 | >7 | >7 | >5 | >7 |
| Impact strength (cm) (*1) |  |  |  |  |  |  |

TABLE 2-continued

|  | Example 4 | Example 5 | Example 6 | Example 7 | Example 8 | Example 9 |
|---|---|---|---|---|---|---|
| Top surface | >50 | >50 | >50 | >50 | >50 | >50 |
| Back surface | >50 | >50 | >50 | >50 | >10 | >50 |
| Chemical tests |  |  |  |  |  |  |
| Alkali resistance (hours) (*2) | >60 | >60 | >60 | >60 | >60 | >60 |
| Acid resistance (hours) (*3) | >24 | >24 | >24 | >24 | >24 | >24 |
| Solvent resistance (hours) (*4) | >24 | >24 | >24 | >24 | >24 | >24 |
| Water resistance (days) (*5) | >30 | >30 | >30 | >30 | >30 | >30 |
| Corrosion resistance (*6) |  |  |  |  |  |  |
| 48 hours | ⊙ | ⊙ | ⊙ |  | △ | ⊙ |
| 240 hours | ⊙ | ⊙ | ⊙ |  | X | △ |

(*1) to (*6): The same as the footnote to Table 1

What we claim is:
1. A coating composition for cathode-precipitating electrodeposition consisting essentially of
    (A) 100 parts by weight of an unsaturated organic compound having a molecular weight of 500 to 10,000 containing a carbon-carbon double bond in an amount corresponding to an iodine value of 100 to 500, said unsaturated organic compound being selected from the group consisting of (a) a polymer of a conjugated diolefin containing 4 to 8 carbon atoms, (b) a copolymer of at least two conjugated diolefins containing 4 to 8 carbon atoms, (c) a copolymer of at least one conjugated diolefin containing 4 to 8 carbon atoms and a vinyl monomer having ethylenic unsaturation containing 2 to 20 carbon atoms, (d) a natural oil, (e) a natural fat and (f) a petroleum resin produced by cationic polymerization of petroleum cracking fractions containing 4 to 10 carbon atoms with a Friedel-Crafts catalyst, said unsaturated organic compound having bonded thereto, through a carbon-carbon bond, basic groups of the formula

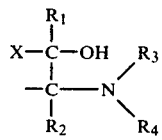

wherein $R_1$ and $R_2$, independently from each other, represent a hydrogen atom or a methyl group, $R_3$ and $R_4$, independently from each other, represent a hydrogen atom or an organic radical having 1 to 10 carbon atoms, at least one of $R_3$ and $R_4$ represents an organic radical, X represents a hydrogen atoms or a bond, and when X represents a bond, the carbon atom to which $R_1$ is attached and the carbon atom to which $R_2$ is attached may form part of the main chain, the amount of said basic groups in said component (A) being 0.02 to 0.3 mole per 100 g of said component (A), and (B) 3 to 100 parts by weight of at least one compound represented by the general formula

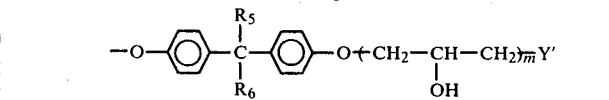

wherein $R_5$ and $R_6$, independently from each other, represent a hydrogen atom or an alkyl group having 1 to 10 carbon atoms, n is an integer of from 0 to 20, m is 1 or 0, Y is a group of the formula

in which $R'_3$ represents an organic radical having 1 to 10 carbon atoms and $R'_4$ represents a hydrogen atom or an organic radical having 1 to 10 carbon atoms, a residue of a carboxylic acid having 1 to 20 carbon atoms, or a residue of a phenolic compound having 6 to 20 carbon atoms, and Y' represents a hydrogen atom when m is 0 and Y when m is 1, said component (A) and said component (B) being neutralized with an organic acid or an inorganic acid and dissolved or dispersed in water.

2. The composition of claim 1 wherein $R_3$ and $R_4$ independently from each other, represent a hydrogen atom, or a hydrocarbon radical having 1 to 10 carbon atoms, which might be partly replaced by a hydroxyl group.

3. The composition of claim 1 wherein said component (B) is a compound obtained by reacting a glycidyl compound of the following formula

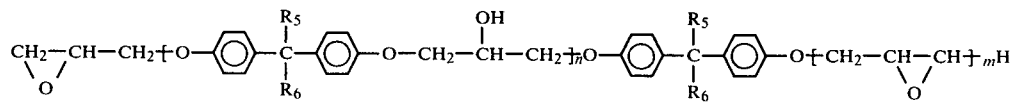

wherein $R_5$, $R_6$, m and n are as defined, with a primary or secondary amine of the formula

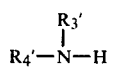

wherein $R'_3$ and $R'_4$ are as defined, at a temperature of from 0° to 200° C. to convert substantially all of groups in said glycidyl compound to group of the formula

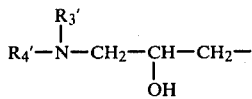

wherein R'₃ and R'₄ are as defined.

4. The composition of claim 1 wherein said component (B) is a compound obtained by reacting a glycidyl compound of the formula

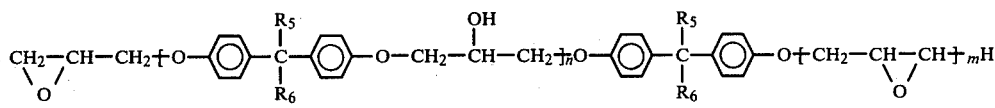

wherein R₅, R₆, m and n are as defined, with a carboxylic acid of the formula

Z—COOH wherein Z represents a residue of a carboxylic acid having 1 to 20 carbon atoms, or a phenolic compound of the formula

Z'—OH wherein Z' represents a residue of a phenolic compound having 6 to 20 carbon atoms, at a temperature of from 0° to 200° C. to convert substantially all of groups

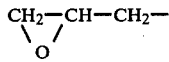

of said glycidyl compound to groups of the formula

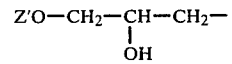

wherein Z is as defined, or groups of the formula $$Z'O-CH_2-CH-CH_2-$$
$$\phantom{Z'O-CH_2-}\,|$$
$$\phantom{Z'O-CH_2-}\,OH$$

wherein Z' is as defined.

5. The composition of claim 4 wherein Z represents a residue of an unsaturated carboxylic acid having 3 or 4 carbon atoms.

6. The composition of claim 5 wherein said unsaturated carboxylic acid is represented by the formula

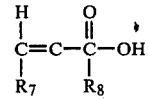

wherein R₇ and R₈ represent a hydrogen atom or a methyl group, and at least one of them represents a hydrogen atom.

7. The composition of claim 1 wherein said component (B) consists of a compound (B') of the formula for (B) in which Y is

in which R'₃ and R'₄ are as defined and a compound (B") of the formula for (B) in which Y is the residue of carboxylic acid or phenolic compound, the total amount of said compounds (B') and (B") being 3 to 100 parts per 100 parts by weight of component (A).

* * * * *